(12) United States Patent
Takaki

(10) Patent No.: US 10,775,497 B2
(45) Date of Patent: Sep. 15, 2020

(54) OBJECT DETECTION DEVICE AND OBJECT DETECTION METHOD

(71) Applicant: DENSO CORPORATION, Kariya, Aichi-pref. (JP)

(72) Inventor: Ryo Takaki, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 109 days.

(21) Appl. No.: 16/088,728

(22) PCT Filed: Mar. 31, 2017

(86) PCT No.: PCT/JP2017/013835
§ 371 (c)(1),
(2) Date: Sep. 26, 2018

(87) PCT Pub. No.: WO2017/171083
PCT Pub. Date: Oct. 5, 2017

(65) Prior Publication Data
US 2019/0113615 A1    Apr. 18, 2019

(30) Foreign Application Priority Data

Apr. 1, 2016  (JP) .................................. 2016-074643

(51) Int. Cl.
*G06K 9/00*    (2006.01)
*G01S 13/931*  (2020.01)
(Continued)

(52) U.S. Cl.
CPC ........... *G01S 13/931* (2013.01); *B60W 30/09* (2013.01); *G01S 13/867* (2013.01); *G01S 17/86* (2020.01);
(Continued)

(58) Field of Classification Search
CPC ................. B60W 10/18; B60W 10/30; B60W 2050/143; B60W 2050/146;
(Continued)

(56) References Cited

U.S. PATENT DOCUMENTS 6,768,446 B2 * 7/2004 Tamatsu .................. G01S 7/414
                                                      342/70
6,903,680 B2 * 6/2005 Samukawa ........... G01S 17/931
                                                     342/173
(Continued)

FOREIGN PATENT DOCUMENTS

JP    2002-296350 A   10/2002
JP    2006-293835 A   10/2006
JP    2015-132553 A    7/2015

*Primary Examiner* — Avinash Yentrapati
(74) *Attorney, Agent, or Firm* — Maschoff Brennan

(57) ABSTRACT

A driving support ECU includes: a lateral width acquisition unit that acquires from an image a dimension of an object in a lateral direction with respect to an imaging direction of an imaging means as a lateral width; a determination unit that compares the current lateral width with a past lateral width to determine whether the current width is smaller than the past lateral width; and a correction unit that, when the current lateral width is smaller than the past lateral width, corrects right and left end positions of the lateral width based on whichever is smaller, the deviation amount of the right end position of the object or the deviation amount of the left and position of the object.

6 Claims, 8 Drawing Sheets

(51) Int. Cl.
- *G06T 7/62* (2017.01)
- *B60W 30/09* (2012.01)
- *G01S 17/86* (2020.01)
- *G01S 17/931* (2020.01)
- *G06T 7/73* (2017.01)
- *G01S 13/86* (2006.01)
- *G08G 1/16* (2006.01)

(52) U.S. Cl.
CPC .............. *G01S 17/931* (2020.01); *G06T 7/62* (2017.01); *G06T 7/73* (2017.01); *G08G 1/166* (2013.01); *G01S 2013/9323* (2020.01); *G06T 2207/30252* (2013.01)

(58) Field of Classification Search
CPC ......... B60W 2420/42; B60W 2554/00; B60W 2554/4041; B60W 2554/801; B60W 2554/803; B60W 30/085; B60W 30/09; B60W 50/14; G01S 13/867; G01S 13/931; G01S 17/86; G01S 17/931; G01S 2013/9323; G06T 2207/30252; G06T 2207/30261; G06T 7/60; G06T 7/62; G06T 7/73; G08G 1/166; A61B 2034/2057; A61B 2034/2065; G06K 2209/21

See application file for complete search history.

(56) References Cited

U.S. PATENT DOCUMENTS

| | | | |
|---|---|---|---|
| 10,569,767 B2* | 2/2020 | Takaki | G08G 1/166 |
| 2003/0218564 A1* | 11/2003 | Tamatsu | G01S 7/414 |
| | | | 342/70 |
| 2015/0109164 A1* | 4/2015 | Takaki | G01S 13/867 |
| | | | 342/27 |
| 2015/0298692 A1* | 10/2015 | Minemura | B60W 30/09 |
| | | | 701/70 |
| 2018/0297591 A1* | 10/2018 | Minemura | B60W 30/08 |

\* cited by examiner

FIG.5
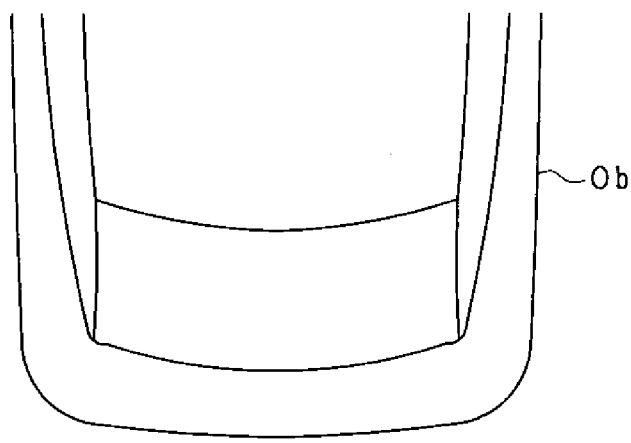
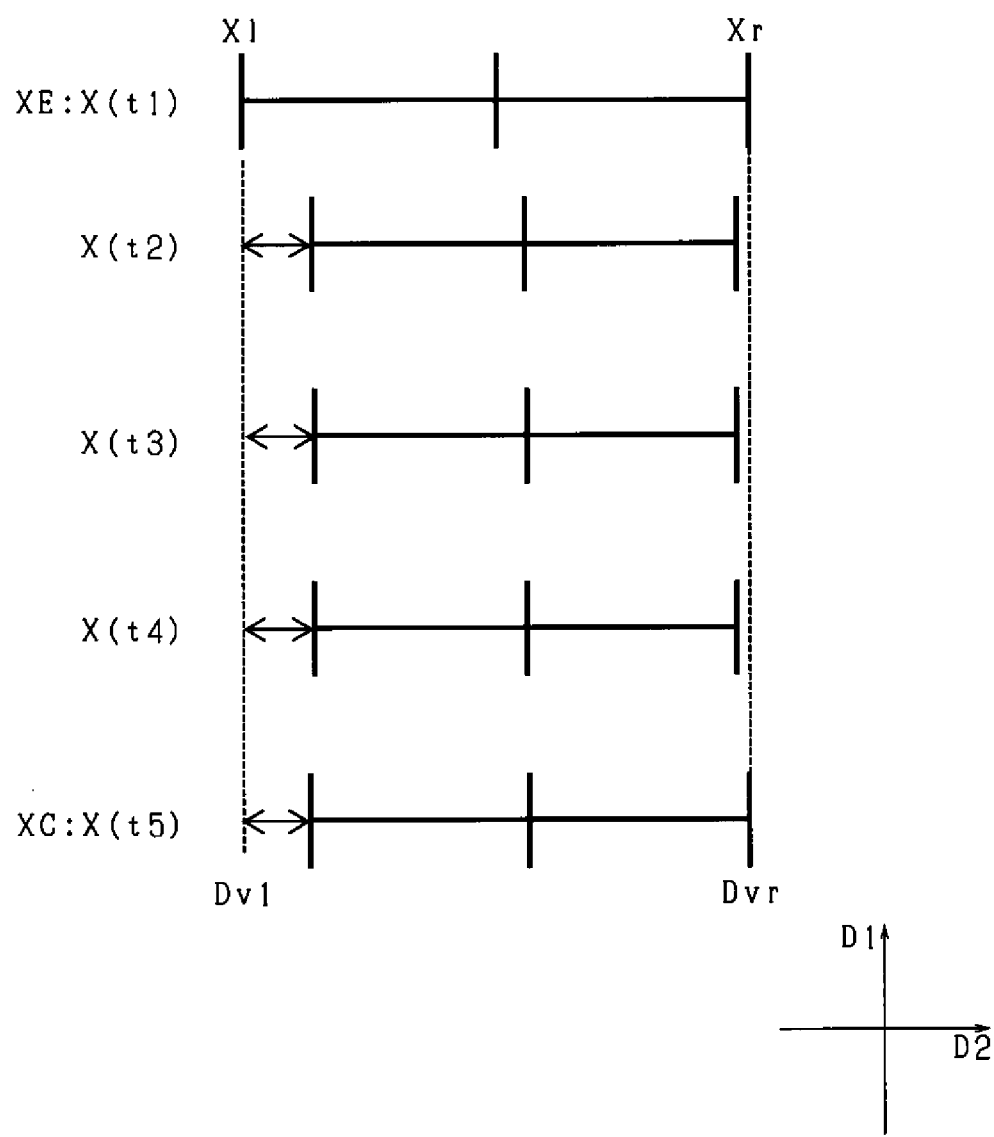

OBJECT DETECTION DEVICE AND OBJECT DETECTION METHOD

CROSS-REFERENCE TO RELATED APPLICATION

This patent application is a national stage application under 35 U.S.C. § 371(c) of PCT Application No. PCT/JP2017/013835, filed on Mar. 31, 2017, which claims priority to Japanese Patent Application No. 2016-074643 filed on Apr. 1, 2016 in the Japan Patent Office, the entire disclosure of which is incorporated herein by reference.

TECHNICAL FIELD

The present disclosure relates to an object detection device that detects an object based on an image captured by an imaging means, and an object detection method.

BACKGROUND ART

For example, PTL 1 discloses a device that includes a radar sensor in a vehicle and acquires the lateral width of an object as a lateral dimension from a reflection point on the object by the radar sensor. The device described in PTL 1 determines that the true value of the lateral width is not detected when the object is positioned at an end of the probe range of the radar sensor or when another object exists in front of the target object. When determining that the object is not detected, the device corrects the current lateral width by a past lateral width recorded in a history.

According to PTL 1, even when the lateral width of an object is not correctly detected, the lateral width is corrected based on the past history information to suppress a problem that a warning or the like is given due to a failure to acquire the correct lateral width.

CITATION LIST

Patent Literature

[PTL 1] JP 2002-296350 A

SUMMARY OF THE INVENTION

When the lateral width of an object is acquired based on an image captured by an imaging means such as a camera or the like, the acquired lateral width of the object may incorrectly be smaller than in reality. The incorrect acquisition of lateral width of an object can occur regardless of the position of the object relative to the imaging means or whether another object exists in front of the target object. Therefore, according to the disclosure of PTL 1, even though the acquired lateral width of an object is smaller than in reality, it may be determined that the lateral width of the object is correctly detected.

The present disclosure has been conceived to solve the aforementioned problem. An object of the present disclosure is to provide an object detection device that correctly acquires the lateral width of an object positioned around a subject vehicle, and an object detection method.

According to the present disclosure, an object detection device detects an object existing around a vehicle based on an image captured by an imaging means. The object detection device includes: a lateral width acquisition unit that acquires a dimension of the object in a lateral direction with respect to an imaging direction of the imaging means as a lateral width; a determination unit that compares the current lateral width acquired by the lateral width acquisition unit with a past lateral width to determine whether the current lateral width is smaller than the past lateral width; and a correction unit that, when the current lateral width is smaller than the past lateral width, corrects right and left end positions of the current lateral width based on whichever is smaller, the deviation amount of the right end position of the object or the deviation amount of the left and position of the object.

The lateral width of an object may incorrectly be acquired to be smaller than in reality depending on the shape and pattern of outer surface of the object, attachments to the object, and the like. In this case, both the right and left end positions of the object are displaced. The deviation amounts of the right and left end positions of the lateral width are compared in magnitude relationship, under the concept that the end position with the smaller deviation amount more likely to have been correctly acquired than the end position with the larger deviation amount. Then, when the current width is smaller than the past lateral width, the right and left end positions of the lateral width are corrected based on the smaller one of the deviation amount of the right end position of the object or the deviation amount of left end position of the object. Accordingly, the right and left end positions of the lateral width can be corrected by the same deviation amount to suppress significant displacements of the right and left end positions of the lateral width and acquire the proper object width.

BRIEF DESCRIPTION OF THE DRAWINGS

The foregoing and other objects, features, and advantages of the present disclosure will be more clarified by the following detailed description with reference to the attached drawings:

FIG. 5 is a diagram describing deviation amounts DV;

DESCRIPTION OF EMBODIMENTS

Embodiments of an object detection device and an object detection method according to the present disclosure will be described below with reference to the drawings. In the embodiments described below, identical or equivalent components are given the same reference signs and descriptions of the components with the same reference signs are incorporated by reference.

First Embodiment

Figure 1:
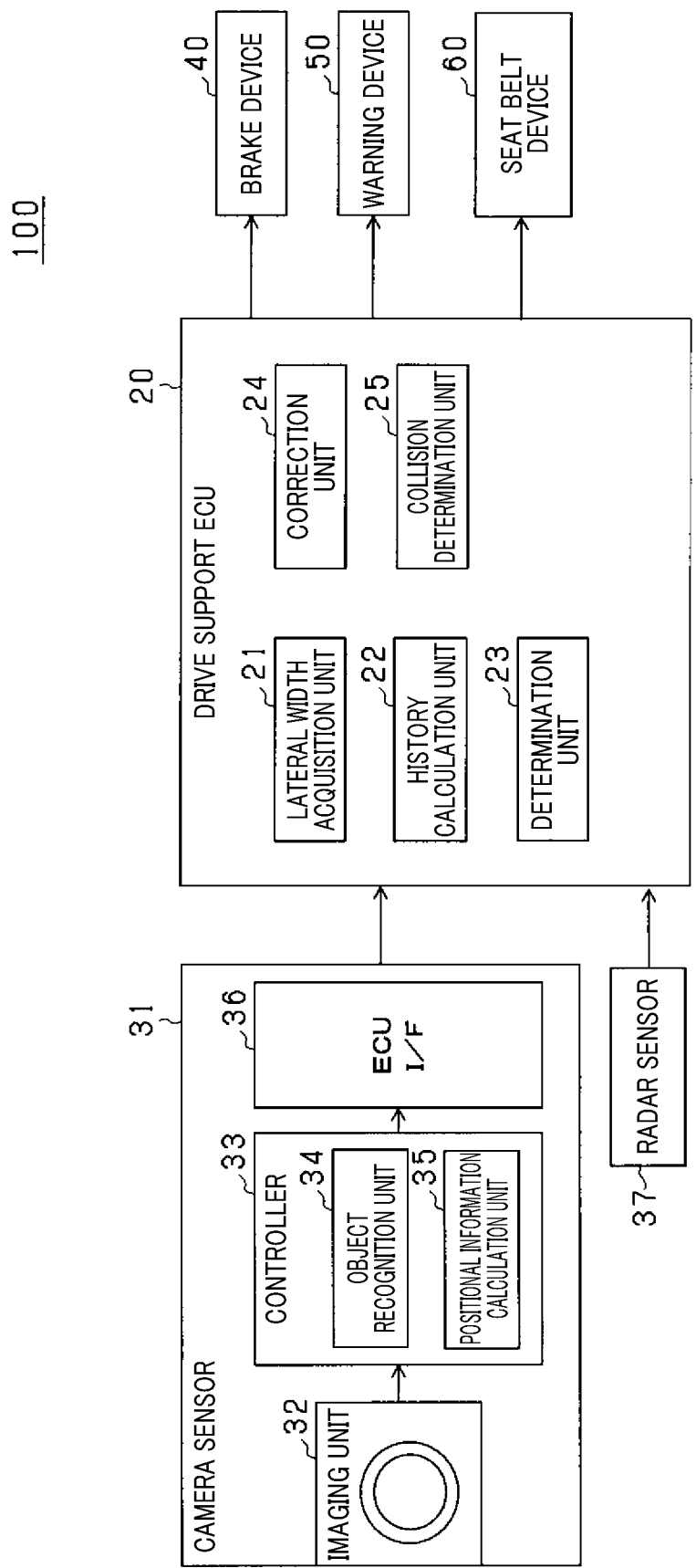
FIG. 1 is a configuration diagram of a PCSS.

FIG. 1 illustrates a pre-crash safety system (hereinafter, called PCSS) 100 to which an object detection device and an object detection method are applied. The PCSS 100 is an example of a vehicle system installed in a vehicle, for example, which detects an object in front of the vehicle. When there is a risk of a collision between the detected object and the vehicle, the PCSS 100 performs processes for avoiding a collision of the subject vehicle with the object or mitigating the collision. In the following description, the vehicle equipped with the PCSS 100 will be called subject vehicle CS, and the object as a target of detection will be called target object Ob.

As illustrated in FIG. 1, the PCSS 100 includes various sensors, a driving support ECU 20, a brake device 40, a warning device 50, and a seat belt device 60. In the embodiment illustrated in FIG. 1, the driving support ECU 20 functions as an object detection device.

The various sensors are connected to the driving support ECU 20 to output detection results of the target object Ob to the driving support ECU 20. Referring to FIG. 1, the various sensors include a camera sensor 31 and a radar sensor 37.

The camera sensor 31 is formed from a CCD camera, a CMOS image sensor, or a near infrared sensor, for example. The camera sensor 31 is arranged on the front side of the subject vehicle CS to recognize the object Ob in front of the subject vehicle CS. The camera sensor 31 includes an imaging unit 32 that captures an image of the area in front of the subject vehicle, a controller 33 that performs known image processing on the image acquired by the imaging unit 32, and an ECU I/F 36 that allows communications between the controller 33 and the driving support ECU 20. The imaging unit 32 functions as an imaging means.

The imaging unit 32 includes a lens part that functions as an optical system and an imaging element that converts light collected through the lens part into an electrical signal. The imaging element can be a known imaging element such as a CCD or a CMOS. The electrical signal converted by the imaging element is stored as a captured image in the controller 33 through an ECU I/F 36.

The controller 33 is formed from a known computer including a CPU, ROM, and RAM. The controller 33 includes functionally an object recognition unit 34 that recognizes the target object Ob seen in the captured image and a positional information calculation unit 35 that calculates positional information of the recognized object. The object recognition unit 34 recognizes the target object Ob from the captured image using dictionary information. The positional information calculation unit 35 calculates the relative position of the recognized target object Ob to the subject vehicle CS.

Specifically, the object recognition unit 34 acquires image data from the imaging unit 32, and determines the kind of the target object Ob in front of the subject vehicle based on the image data and prepared dictionary information for object identification. The dictionary information for object identification is prepared for the individual kinds of objects such as automobile, two-wheel vehicle, and pedestrian, for example, and is stored in advance in the memory. The dictionary information for automobile is preferably prepared for at least a front part pattern and a rear part pattern. The dictionary information for two-wheel vehicle is preferably prepared to differentiate between bicycle and motorcycle. The object recognition unit 34 determines the kind of the target object Ob by comparing the image data with the dictionary information and conducting pattern matching. The dictionary information may include not only dictionary information for moving objects but also dictionary information for stationary objects such as guard rails, utility poles, road signs, and others.

Figure 2:
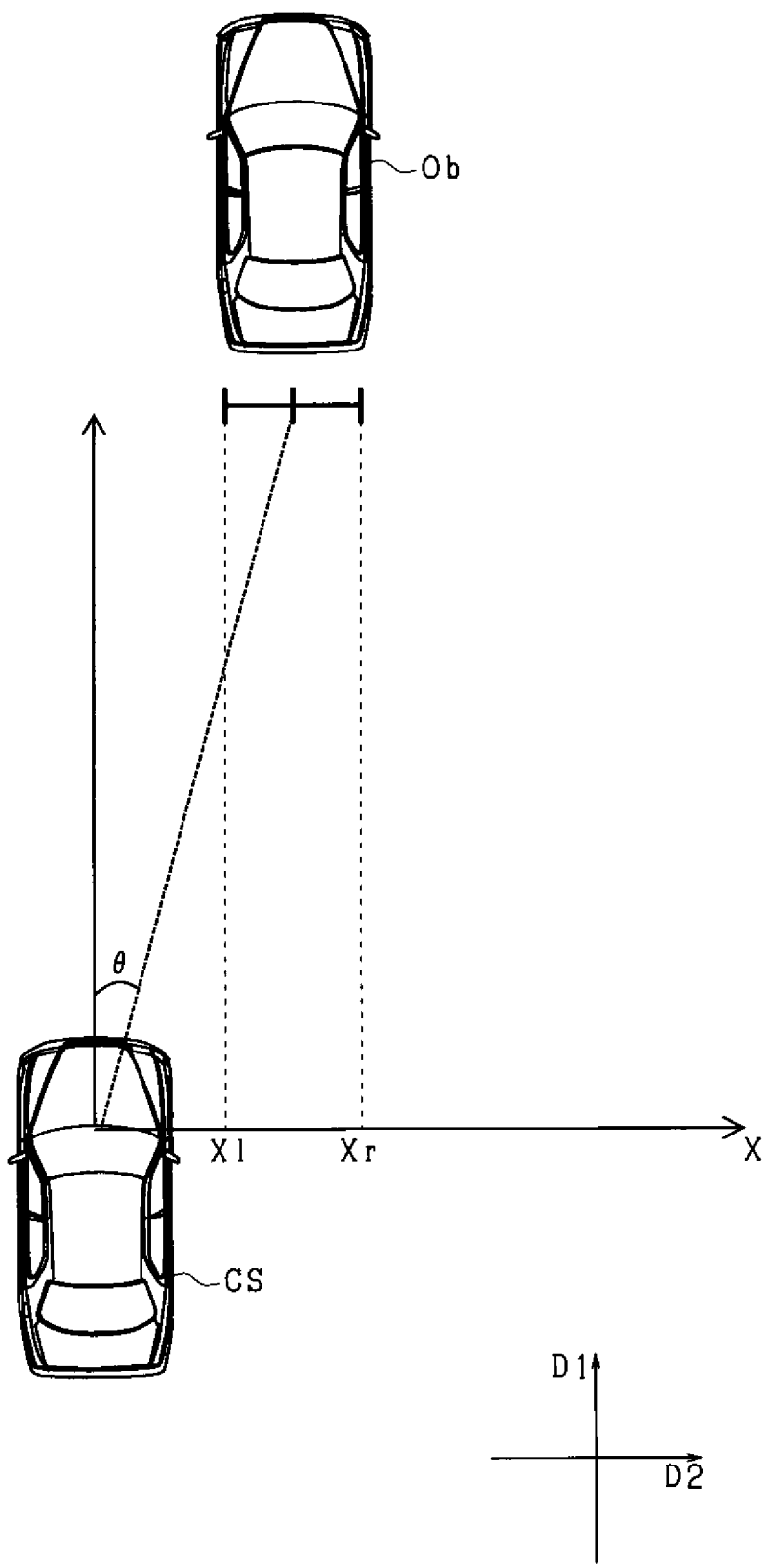
FIG. 2 is a diagram describing positional information of a target object Ob detected by a controller.

As illustrated in FIG. 2, the positional information calculation unit 35 acquires positional information indicating the right and left relative positions of the target object Ob in a lateral direction D2 with respect to the imaging direction of the camera sensor 31. The positional information includes a lateral position X (Xl and Xr) indicating the right and left side positions of the target object Ob as seen in the lateral direction D2 and an azimuth angle θ indicating the direction from the subject vehicle CS to the target object Ob. For example, the positional information calculation unit 35 calculates the azimuth angle θ using the lateral position X and the position of the subject vehicle CS.

The radar sensor 37 detects an object in front of the subject vehicle using directive electromagnetic waves such as millimeter waves or laser beams. The radar sensor 37 is installed in the front part of the subject vehicle such that its optical axis faces the area in front of the subject vehicle. The radar sensor 37 scans the area expanding in front of the vehicle within a predetermined scope with transmitted waves at predetermined time intervals, and receives reflected waves reflected by the surface of the object in front to acquire the distance to the object in front and the relative velocity to the object in front as object information. The radar sensor 37 inputs the acquired object information to the driving support ECU 20.

The brake device 40 includes a brake mechanism that changes braking force of the subject vehicle CS and a brake ECU that controls the operation of the brake mechanism. The brake ECU is communicably connected to the driving support ECU 20 and controls the brake mechanism under control of the driving support ECU 20. The brake mechanism includes, for example, a master cylinder, a wheel cylinder that applies braking force to the wheels, and an ABS actuator that adjusts the distribution of pressure (hydraulic pressure) from the master cylinder to the wheel cylinder. The ABS actuator is connected to the brake ECU and adjusts the hydraulic pressure from the master cylinder to the wheel cylinder under control of the brake ECU to regulate the amount of operation on the wheels.

The warning device 50 warns the driver about the presence of the target object Ob in front of the subject vehicle under control of the driving support ECU 20. The warning device 50 is formed from a speaker provided in the cabin and a display unit that displays an image, for example.

The seat belt device 60 is a pretensioner that draws in a seat belt provided in each seat of the subject vehicle. When there is an increasing probability of a collision between the subject vehicle CS and the target object Ob, the seat belt device 60 performs a preliminary action of drawing in the seat belt. If the collision is inevitable, the seat belt device 60 draws in the seat belt to take the slack out of the seat belt, thereby securing the passenger such as the driver in the seat to protect the passenger.

The driving support ECU 20 is formed from a known microcomputer including a CPU, a ROM, and a RAM. The driving support ECU 20 refers to arithmetic programs and control data in the ROM to control the subject vehicle CS. The driving support ECU 20 also detects the target object Ob based on the image captured by the camera sensor 31, and performs PCS on at least one of the devices 40, 50, and 60 based on the detection result.

The driving support ECU 20 performs programs stored in the ROM to function as a lateral width acquisition unit 21, a history calculation unit 22, a determination unit 23, a correction unit 24, and a collision determination unit 25.

Figure 3:
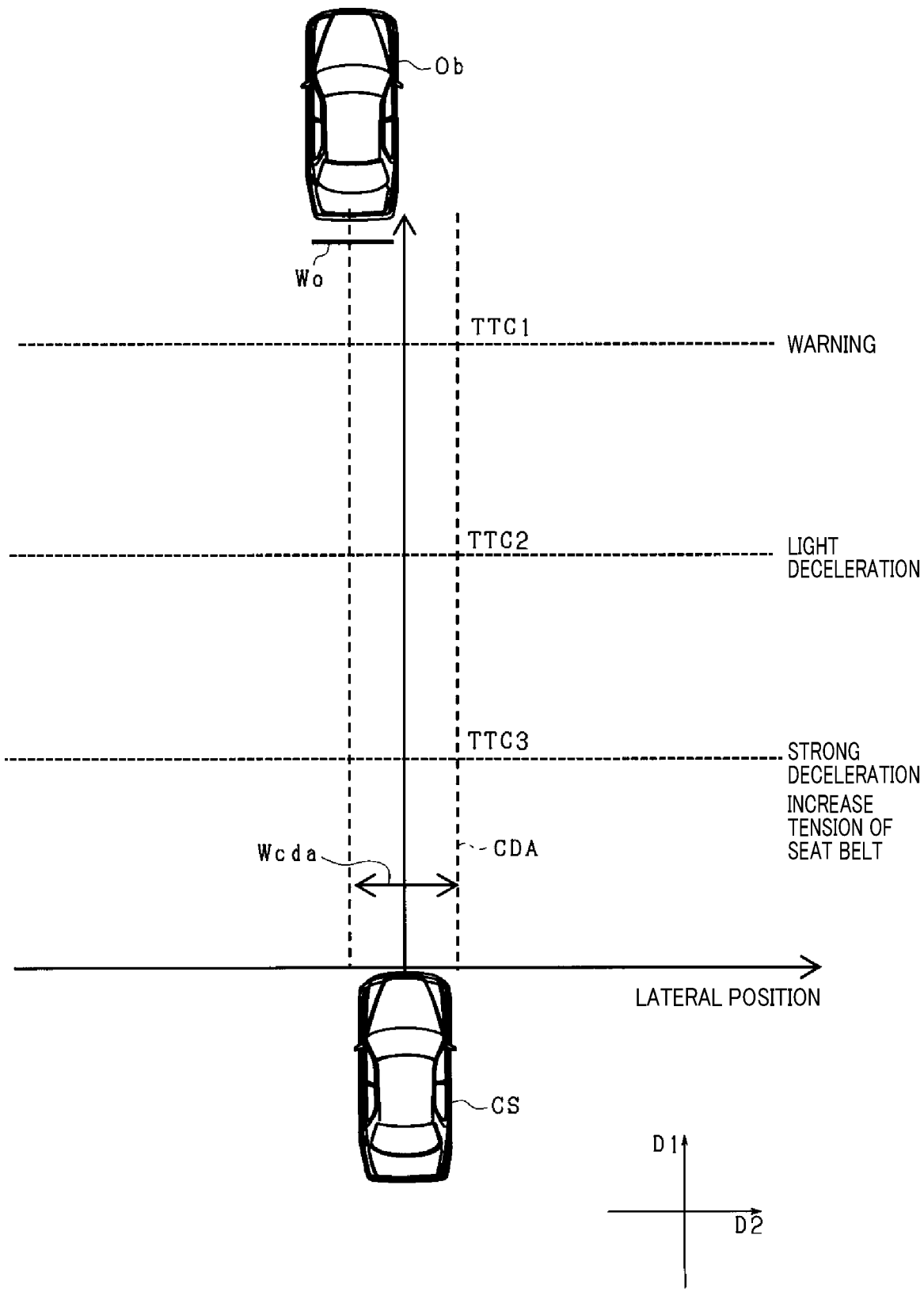
FIG. 3 is a diagram describing PCS performed by a driving support ECU.

First, the PCS performed by the driving support ECU 20 will be described with reference to FIG. 3. The collision determination unit 25 determines the probability of a collision between the subject vehicle CS and the target object Ob.

In the embodiment, the collision determination unit 25 determines the probability of a collision using the lateral position of the target object Ob relative to the subject vehicle CS. FIG. 3 illustrates the timings for actions of the PCS with TTC on the vertical axis and the lateral position on the lateral axis, with respect to the subject vehicle CS. The TTC decreases with a value on the vertical axis increasing proximity to the subject vehicle CS, which means that the time before the target object Ob collides with the subject vehicle CS is shorter.

The collision determination unit 25 determines the probability of a collision with the target object Ob using overlap ratio RR of an object width WO indicating the lateral dimension of the target object Ob and a collision determination area CDA virtually set in front of the subject vehicle. The collision determination area CDA is a virtual area that has a predetermined width Wcda in the lateral direction of the vehicle and extends in an imaging axial direction (imaging direction) D1. The overlap ratio RR refers to the amount of the object width WO overlapping the width Wcda of the collision determination area CDA, which is calculated by the following equation (1):

$$\text{Overlap ratio } RR = WO/Wcda \quad (1)$$

The inclination of the collision determination area CDA with respect to the imaging axial direction D1 is set based on the movement path of the target object Ob.

When the overlap ratio RR is equal to or higher than a predetermined value, the collision determination unit 25 calculates a time to collision (TTC) indicating the time before the target object Ob collides with the subject vehicle CS. The collision determination unit 25 performs the individual actions of the PCS according to the TTC. In the embodiment, for example, at TTC1, the collision determination unit 25 controls the warning device 50 to warn the driver about the presence of the target object Ob in front of the subject vehicle in the traveling direction. At TTC2, the collision determination unit 25 controls the brake device 40 to perform automatic braking to gently decelerate the subject vehicle CS by a predetermined amount. At TTC3, the collision determination unit 25 decelerates the subject vehicle CS under control of the brake device 40 and performs a preliminary action to increase the tension of the seat belt device 60. At TTC3, the collision determination unit 25 strongly decelerates the subject vehicle CS by a larger deceleration amount than that at TTC2.

If the object width WO is recognized to be smaller than in reality at the determination of the overlap ratio RR, the calculated overlap ratio RR becomes lower so that collision avoidance control may not be correctly performed even through there is actually a high probability of a collision with the target object Ob. Specifically, when the camera sensor 31 calculates the lateral position X based on the captured image and the dictionary information and calculates the object width WO based on the lateral position X, the calculated object width WO may incorrectly be smaller than in reality depending on the shape and pattern of the outer surface of the target object Ob and attachments to the target object Ob. In addition, when the target object Ob is a vehicle running in front of the subject vehicle, the rear part of the vehicle has projections and depressions, and lamps different among vehicle types, and thus at the calculation of the object width WO, the object width WO may be recognized as smaller than the real lateral width.

Figure 4:
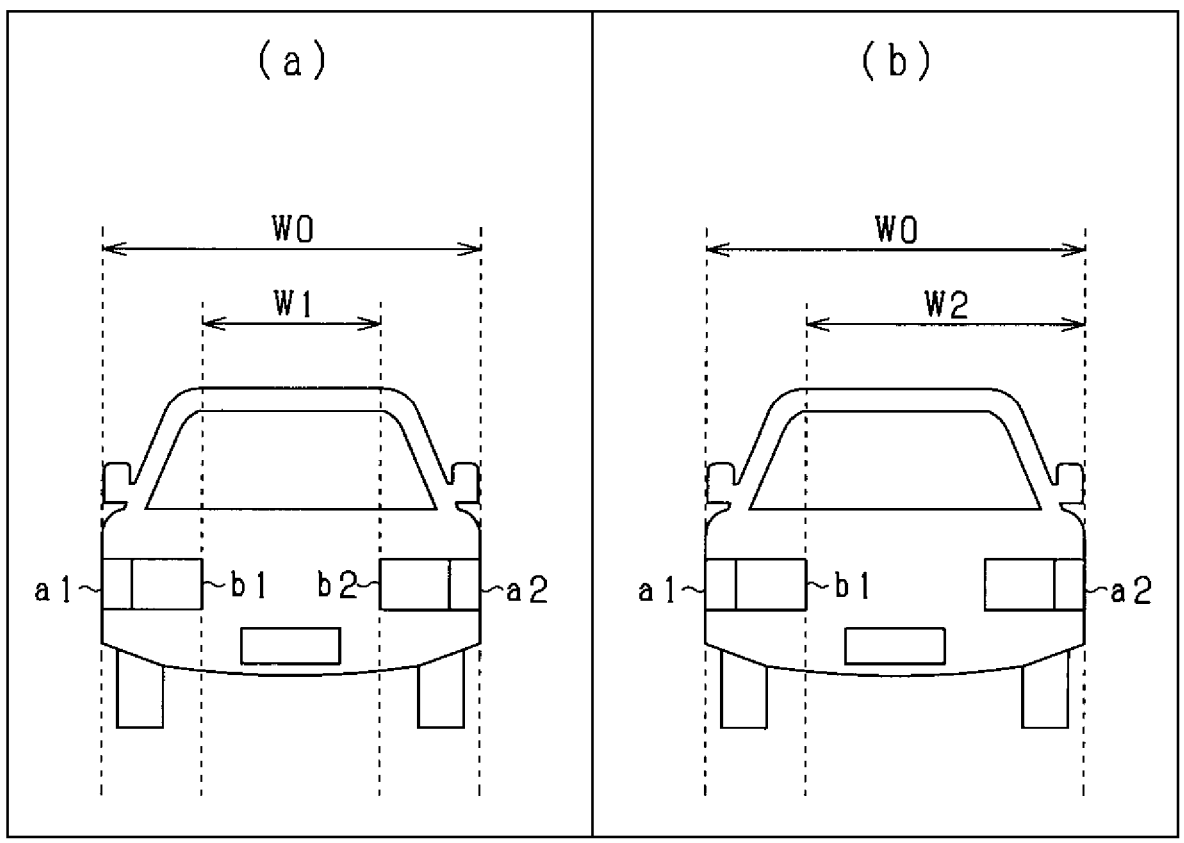
FIG. 4 is a diagram describing detection of width of an object.

Referring to the vehicle illustrated in FIGS. 4(a) and 4(b), the real object width WO ranges from an end point a1 to an end point a2 of the rear part of the vehicle. However, the rear part of the vehicle in front has tail lamps, and the dictionary information is considered as being assigned to the shape and pattern of the tail lamps. That is, the rear part of the vehicle has appearance change points b1 and b2 due to the tail lamps, for example, in addition to the end points a1 and a2, and the change points b1 and b2 may be recognized as end points of the rear part of the vehicle body. In this case, the object width WO is calculated from a lateral width W1 between the change points b1 and b2 and a lateral width W2 between the change point b1 and the end point a2 in the image, and recognized as being smaller than in reality. Although not illustrated, it is considered that the object widths WO of objects other than vehicles could be similarly recognized as being smaller than in reality.

Accordingly, when the object width WO may be recognized as being smaller than in reality, the driving support ECU 20 extends and corrects the lateral position X. Next, the functions of the driving support ECU 20 for correcting the object width WO will be described.

Returning to FIG. 1, the lateral width acquisition unit 21 acquires the object width WO. The lateral width acquisition unit 21 acquires the lateral position X and the azimuth angle θ from the positional information output from the camera sensor 31, and uses the acquired lateral position X to calculate the object width WO indicating the dimension of the target object Ob in the lateral direction D2.

The history calculation unit 22 records the lateral position X acquired by the lateral width acquisition unit 21 as an acquisition history. In the case where the lateral position X is acquired at predetermined time intervals, the lateral position X is recorded by the kind of the target object Ob in the acquisition history. In addition to the lateral position X, the azimuth angle θ is recorded in the acquisition history.

The determination unit 23 determines whether the current object width WO acquired by the lateral width acquisition unit 21 is small by comparison to the acquisition history. Hereinafter, the latest lateral position X recorded in the acquisition history will be called current lateral position XC, and the object width WO calculated by the lateral width acquisition unit 21 from the latest lateral position XC will be called current object width WC. The determination unit 23 also calculates an estimated lateral width WE indicating the dimension of the target object Ob in the lateral direction D2 based on the acquisition history, and compares the current object width WC with the estimated lateral width WE to determine whether the current object width WC is smaller. Specifically, the determination unit 23 uses the largest one of the object widths WO calculated from the lateral positions X recorded in the acquisition history as the estimated lateral width WE.

When it is determined that the current object width WC is smaller than the estimated lateral width WE, the correction unit 24 corrects the current lateral position XC based on a smaller deviation amount DV of the deviation amounts DV of the lateral position X of the target object Ob. According to the correction of the current lateral position XC by the correction unit 24, the object width WO is extended and corrected in the lateral direction D2.

The deviation amounts DV have values indicating the variation in a right end point Xr and a left end point Xl of the current lateral position XC in the lateral direction D2. In the embodiment, the correction unit 24 calculates the deviation amounts DV from the differences from the current lateral position XC with respect to the estimated lateral width WE (the maximum value of the object width WO recorded in the acquisition history as expressed in the following equation (2):

$$DVr = |Xmr - Xr|$$

$$DVl = |Xml - Xl| \qquad (2)$$

where DVr and DVl represent respectively right and left deviation amounts of the lateral position X. In the embodiment, Xr and Xl represent the current lateral position XC, and Xmr and Xml represent the lateral position X with the maximum object width WO recorded in the acquisition history.

The deviation amounts DV have values including zero. For example, when either the right end point Xr or the left end point Xl of the current lateral position XC is not changed in the lateral direction D2, the deviation amounts DV become zero.

For example, object widths (t) illustrated in FIG. 5 correspond to the object widths WO calculated by the lateral width acquisition unit 21 at times t1 to t5. In the order of t5 to t1, the object widths WO are represented at earlier times t. Among them, the object width WO (t5) at time t5 is the current object width WC. The object width WO (t1) at time t1 is the maximum object width WO, which constitutes the estimated lateral width WE. In this example, with respect to the object width WO (t1), the current object width WC has the deviation amount DVl of the left end point Xl larger than the deviation amount DVr of the right end point Xr.

The correction unit 24 corrects the current lateral position XC using the smaller deviation amount DV as a correction value ADV. In the example of FIG. 5, the deviation amount DVr of the right end point Xr is smaller than the deviation amount DVl of the left end point Xl, and the deviation amount DVr of the right end point Xr constitutes the correction value ADV. Then, the correction unit 24 corrects the current lateral position XC by the correction value ADV. The thus corrected current lateral position XC is used by the collision determination unit 25 to determine the probability of a collision between the subject vehicle CS and the target object Ob as described above.

Next, a correction process of the object width WO performed by the driving support ECU 20 will be described with reference to the flowchart of FIG. 6. This process is repeatedly performed by the driving support ECU 20 at predetermined time intervals.

In step S11, the driving support ECU 20 calculates the current object width WC. The driving support ECU 20 acquires the latest lateral position X recorded in the history information as the current lateral position XC, and calculates the current object width WC based on the lateral position XC. Step S11 functions as a lateral width acquisition step.

In step S12, the driving support ECU 20 calculates the estimated lateral width WE using the acquisition history. In the first embodiment, the driving support ECU 20 acquires from the acquisition history the lateral position X that is the same in kind as the current object width WC calculated in step S11 and has the maximum object width WO. Then, the driving support ECU 20 uses the acquired lateral position X to calculate the estimated lateral width WE.

In step S13, the driving support ECU 20 determines whether the current object width WC is equal to or less than the estimated lateral width WE. For example, the driving support ECU 20 compares the current object width WC acquired in step S11 to the estimated lateral width WE calculated in step S12. Step S13 functions as a determination step.

When determining that the current object width WC is larger (step S13: NO), the driving support ECU 20 proceeds to step S20. In this case, the driving support ECU 20 determines that the current lateral position XC is proper, and updates the current lateral position XC as the lateral position X of the target object Ob in step S20.

On the other hand, when determining that the current object width WC is smaller than the estimated lateral width WE (step S13: YES), the driving support ECU 20 determines in step S14 whether the current lateral position XC is displaced in the lateral direction D2 with respect to the estimated lateral position XE. When the current lateral position XC and the estimated lateral position XE have the same right end point Xr and left end point Xl, it can be determined that the object width WO is correctly acquired. Accordingly, when not determining in step S14 that the current lateral position XC is displaced in the lateral direction D2 with respect to the estimated lateral position XE (step S14: NO), the driving support ECU 20 proceeds to step S20 to update the current lateral position XC as the lateral position X of the target object Ob.

When determining that the current lateral position XC is displaced in the lateral direction D2 (step S14: YES), the driving support ECU 20 calculates the correction value ADV according to the smaller deviation amount DV of the current lateral position XC in step S15. The driving support ECU 20 uses the foregoing equation (2) to calculate the respective deviation amounts DV of the right end point Xr and the left end point Xl. Then, the driving support ECU 20 determines the smaller deviation amount DV from a comparison between the calculated displacement volumes DV, and calculates the correction value ADV corresponding to the determined deviation amount DV. In the embodiment, the correction value ADV is identical to the value of the smaller deviation amount DV.

In step S16, the driving support ECU 20 determines whether the right end point Xr and the left end point Xl of the current lateral position XC are displaced in the same direction. The driving support ECU 20 determines the displacement directions of the right end point Xr and the left end point Xl by a comparison in the right end point Xr and the left end point Xl between the estimated lateral position XE and the current lateral position XC.

Figure 7:
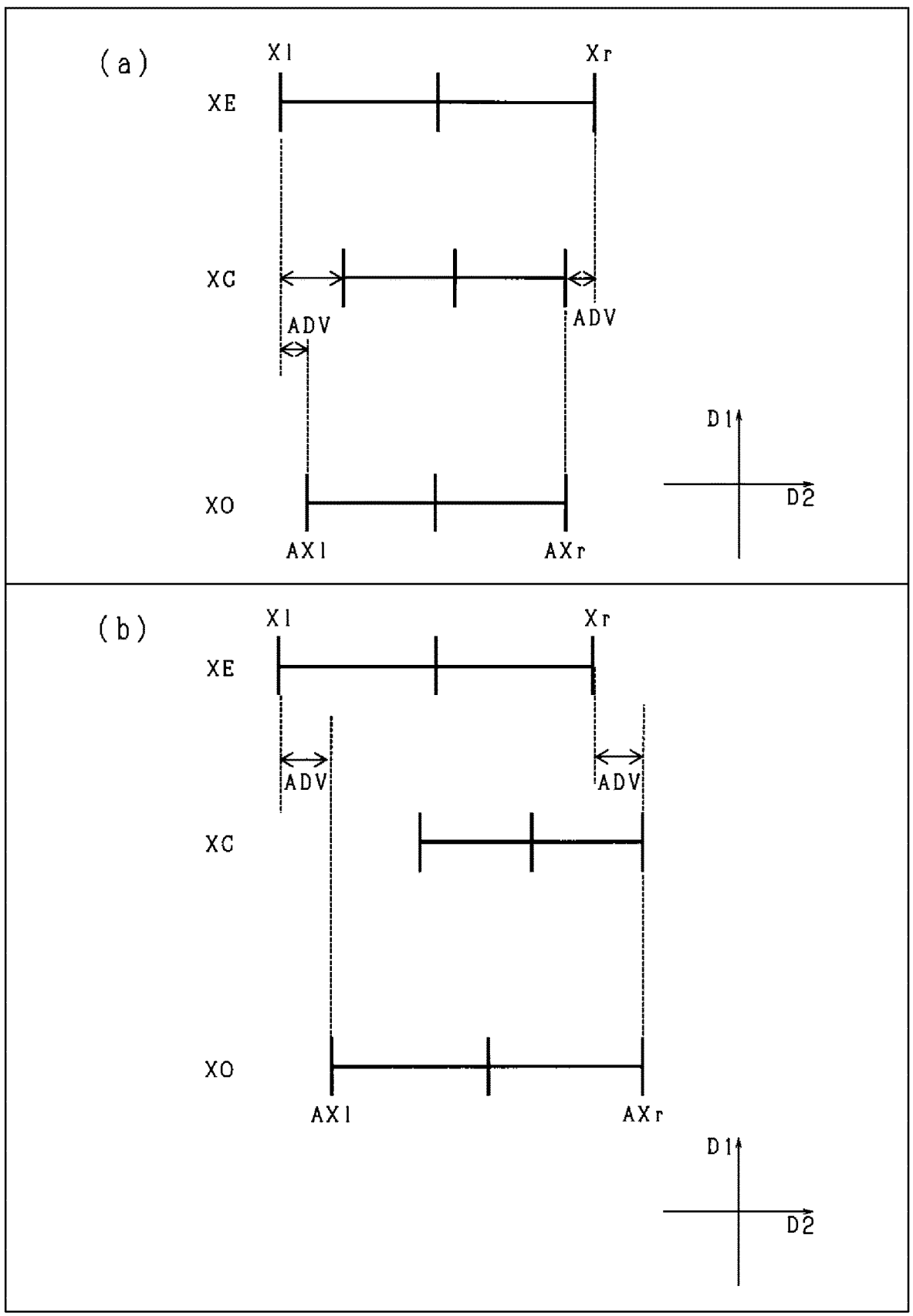
FIG. 7 is a diagram describing the directions of displacements of right and left end positions.

FIG. 7(a) illustrates a case with different displacement directions of the object width WC. When the current object width WC is equal to or less than the estimated lateral width WE and the target object Ob is not moved in the lateral direction D2, the current lateral position X is located inside the estimated lateral position XE.

FIG. 7(b) illustrates a case with the same displacement direction of the right end point Xr and the left end point Xl. When the current object width WC is equal to or less than the estimated lateral width WE and the relative positions of the subject vehicle CS and the target object Ob change in the lateral direction D2, the current lateral position XC has both the right end point Xr and the left end point Xl displaced in the relative movement direction of the subject vehicle CS and the target object Ob as compared to the estimated lateral position XE. For example, when the target object Ob moves in the lateral direction D2 or the subject vehicle CS moves in the lateral direction D2, the right end point Xr and the left end point Xl are displaced in the same direction.

When determining that the right end point Xr and the left end point Xl are displaced in different directions (step S16: NO), the driving support ECU 20 uses the correction value ADV calculated in step S15 to shift and correct the right end point Xr and the left end point Xl of the current lateral position XC at the azimuth angle θ in step S17. Referring to FIG. 7(a), the deviation amount DVr of the right end point Xr is smaller than the deviation amount DVl of the left end point Xl, and the right end point Xr is located inside the right end point Xr of the estimated lateral position XE. Accordingly, the driving support ECU 20 moves the right end point Xr and the left end point Xl of the estimated lateral position XE toward the central side by the correction value ADV calculated according to the deviation amount DVl of the right end point Xr to calculate corrected right end point AXr and left end point AXl.

On the other hand, when determining that the right end point Xr and the left end point Xl are displaced in the same direction (step S16: YES), in step S18, the driving support ECU 20 uses the correction value ADV calculated in step S15 to shift and correct the right end point Xr and the left end point Xl of the current lateral position XC in the movement direction of the target object Ob. Referring to FIG. 7(b), the right end point Xr of the current lateral position XC is located outside the right end point Xr of the estimated lateral position XE to generate movement in the lateral direction D2. Accordingly, the driving support ECU 20 shifts the right end point Xr and the left end point Xl of the estimated lateral position XE to the right by the correction value ADV to calculate the corrected right end point AXr and left end point AXl. Steps S17 and S18 serve as correction steps.

In step S19, the driving support ECU 20 uses the corrected right end point AXr and left end point AXl calculated in step S17 or S18 to recalculate the azimuth angle θ output from the camera sensor 31. For example, the driving support ECU 20 calculates the azimuth angle θ using the corrected right end point AXr and left end point AXl and the current position of the subject vehicle CS.

In step S20, the driving support ECU 20 updates the lateral position X of the target object Ob. In this case, the driving support ECU 20 updates the corrected right end point AXr and left end point AXl and the azimuth angle θ calculated in step S19 as the right end point Xr, the left end point Xl, and the azimuth angle θ of the corrected object width WO.

As described above, in the first embodiment, when the current object width WC is smaller than the past object width WO, the driving support ECU 20 corrects the right end point Xr and the left end point Xl of the current lateral position XC based on the smaller deviation amount DV of the right and left deviation amounts DV of the target object Ob. Accordingly, the right end point Xr and the left end point Xl of the object width WO are corrected by the same deviation amount DV to suppress significant displacements of the right and left positions of the object width WO as compared to the true value, and acquire the proper object width.

The true value of the object width is unlikely to exceed the maximum value of the past lateral width, and the driving support ECU 20 uses the maximum value as the estimated lateral width WE. According to the foregoing configuration, it is possible to prevent the object width WO from being excessively extended.

The driving support ECU 20 sets the position of the past object width WO shifted in the lateral direction D2 by the volume based on the smaller deviation amount DV as the corrected lateral position AX. According to the foregoing configuration, setting the lateral position X of the past object width WO shifted by the same deviation amount DV as the corrected lateral position X makes it possible to prevent significant displacement of the center of the object width WO as compared to the true value.

When the right and left sides of the object width WO of the target object Ob are displaced in the same lateral direction, the driving support ECU 20 corrects the lateral position X of the object width W in the same direction of displacement based on the smaller deviation amount DV. When the relative positions of the target object Ob and the subject vehicle CS change in the lateral direction D2, the lateral position X of the target object Ob changes in the same direction. In such a case, the driving support ECU 20 corrects the right and left sides of the lateral position X in the same lateral direction based on the smaller deviation amount DV. According to the foregoing configuration, the object width WO can be correctly acquired even when the relative positions of the target object Ob and the subject vehicle CS change in the lateral direction D2.

Second Embodiment

In a second embodiment, instead of using the maximum value of the object width WO recorded in the acquisition history as the estimated lateral position XE, the driving support ECU 20 uses the previous object width WO recorded in the acquisition history as the estimated lateral position XE.

Figure 8:
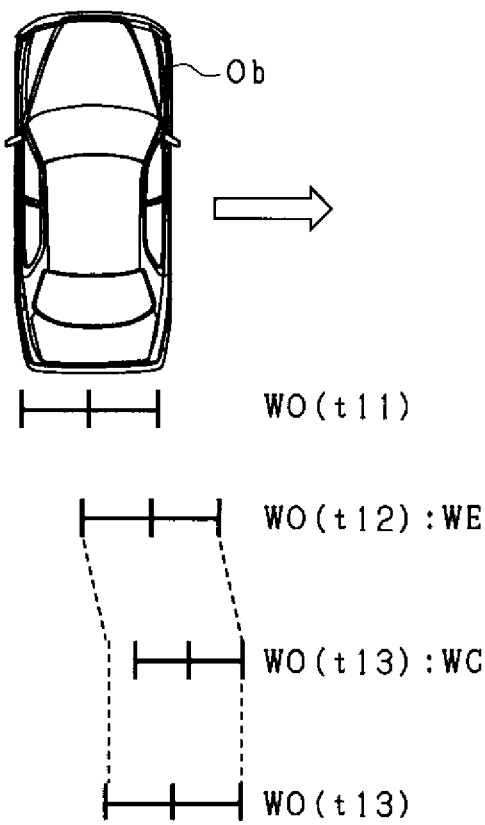
FIG. 8 is a diagram describing correction of an object width WO according to a second embodiment.

FIG. 8 illustrates changes in object width WO at times t11 to t13 when the target object Ob moves to the right in the lateral direction D2 (indicated by an arrow in the drawing). An object width WO(t13) at time t13 is set as the current object width WO, and an object width WO(t12) at time t12 is set as the previous object width WO.

Figure 6:
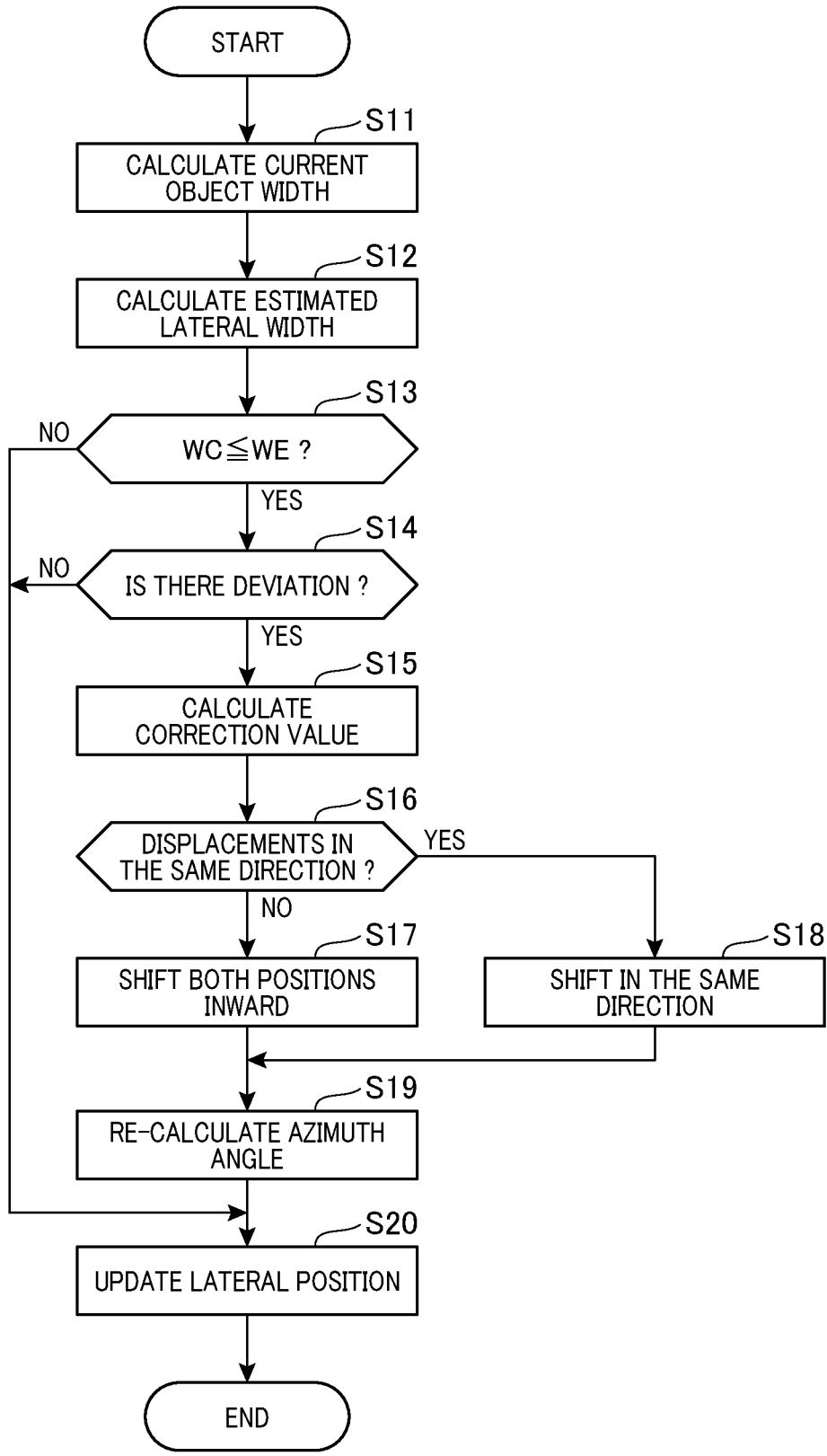
FIG. 6 is a flowchart of a lateral width correction process performed by the driving support ECU.

In the example illustrated in FIG. 8, in step S11 of FIG. 6, the driving support ECU 20 acquires the current object width WC (WO(t13)) based on the lateral position X at time t13. Then, in step S12, the driving support ECU 20 acquires an estimated lateral width WE (object width WO(t12)) based on the estimated lateral position XE at time t12.

In step S15, the driving support ECU 20 calculates the correction value ADV according to the smaller deviation amount DV of the estimated lateral width WE calculated according to a previous lateral position XO and the current lateral position XC. Then, in step S17 or S18, the driving support ECU 20 corrects the current lateral position XC according to the calculated correction value ADV. Referring to FIG. 8, the left end point Xl is changed leftward to extend the corrected object width WO(t13) in the lateral direction.

As described above, when the target object Ob moves laterally, the deviation amount of the object width WO includes a displacement resulting from the incorrect acquisition of the object width WO and a displacement resulting from the lateral movement of the object. Accordingly, the driving support ECU 20 corrects the deviation amount using the previous value of the object width WO. According to the foregoing configuration, even when the target object Ob moves in the lateral direction, the deviation amount resulting from the lateral movement of the target object Ob is diminished by the difference between the previous value and the current value to allow the lateral width of the target object Ob to be correctly acquired.

OTHER EMBODIMENTS

The camera sensor 31 may not calculate the lateral position X and the azimuth angle θ of the target object Ob but the driving support ECU 20 may calculate the lateral position X and the azimuth angle θ of the target object Ob.

In this case, the camera sensor 31 includes the imaging unit 32 and the ECU I/F 36 illustrated in FIG. 1, and the driving support ECU 20 includes functionally the object recognition unit 34 and the positional information calculation unit 35. Then, the driving support ECU 20 calculates the lateral position X and the azimuth angle θ of the target object Ob based on the captured image output from the camera sensor 31.

The camera sensor 31 and the driving support ECU 20 may be configured as an integral device. In this case, the camera sensor 31 includes the functions of the lateral width acquisition unit 21, the history calculation unit 22, the determination unit 23, the correction unit 24, and the collision determination unit 25.

A driving support device 10 may be configured to recognize the target object Ob based on the result of detection of the target object Ob by the camera sensor 31 and the result of detection of the target object Ob by the radar sensor 37.

When it is determined in step S13 of FIG. 6 that the current object width WC is larger, the lateral position X with the maximum object width WO recorded in the acquisition history may be updated as the lateral position X of the target object Ob.

The deviation amounts DV may be calculated by a comparison between the current lateral position XC and the average value of a plurality of past lateral positions X recorded in the acquired history. For example, the driving support ECU 20 calculates the respective average values of the right end point Xr and the left end point Xl of the plurality of past lateral positions X. Then, the driving support ECU 20 calculates the deviation amounts DV by comparing the right end point Xr and the left end point Xl of the current lateral position XC with the calculated average values of the right end point Xr and the left end point Xl.

Instead of determining the probability of a collision between the subject vehicle CS and the target object Ob using the object width WO, the collision determination unit 25 may determine the probability of a collision between the subject vehicle CS and the target object Ob using the position of a central point as seen in the lateral direction D2 determined from the right and left end positions Xr and Xl. In this case, the driving support ECU 20 calculates the position of the target object Ob in the lateral direction D2 with the risk of a collision between the target object Ob and the subject vehicle CS based on the movement path of the position of the central point. Then, the driving support ECU 20 determines the probability of a collision according to the calculated position of the target object Ob in the lateral direction D2.

The present disclosure has been described so far according to the embodiment, but it is noted that the present disclosure is not limited to the foregoing embodiment or structure. The present disclosure includes various modifications and changes in a range of equivalency. In addition, various combinations and modes, and other combinations and modes including only one element of the foregoing combinations and modes, less or more than the one element fall within the scope and conceptual range of the present disclosure.

The invention claimed is:

1. An object detection device that detects an object existing around a vehicle based on an image captured by an imaging means, comprising:
   a lateral width acquisition unit that acquires from the image a dimension of the object in a lateral direction with respect to an imaging direction of the imaging means as a lateral width;
   a determination unit that compares a current lateral width acquired by the lateral width acquisition unit with a past lateral width to determine whether the current lateral width is smaller than the past lateral width; and
   a correction unit that, when the current lateral width is smaller than the past lateral width, corrects right and left end positions of the current lateral width based on whichever is smaller, a deviation amount of a right end position of the object or a deviation amount of a left end position of the object.

2. The object detection device according to claim 1, wherein
   the determination unit determines whether the current lateral width is smaller than the past lateral width by using a maximum width as the past lateral width.

3. The object detection device according to claim 1, wherein
   the correction unit sets right and left end positions of the past lateral width shifted in the lateral direction by a value based on a smaller one of the deviation amount of the right end position or the deviation amount of the left end position.

4. The object detection device according to claim 3, wherein
   the correction unit corrects the right and left end positions of the current lateral width by using a previous lateral width acquired by the lateral width acquisition unit as the past lateral width.

5. The object detection device according to claim 1, wherein
   when the right and left end positions of the object are displaced in the same lateral direction, the correction unit corrects the right and left end positions in the same direction as the right and left end positions of the object are displaced and based on a smaller one of the deviation amount of the right end position or the deviation amount of the left end position.

6. An object detection method for detecting an object existing around a vehicle based on an image captured by an imaging means, comprising:
   a lateral width acquisition step of acquiring from the image a dimension of the object in a lateral direction with respect to an imaging direction of the imaging means as a lateral width;
   a determination step of comparing a current lateral width acquired in the lateral width acquisition step with a past lateral width to determine whether the current lateral width is smaller than the past lateral width; and
   a correction step of, when the current lateral width is smaller than the past lateral width, correcting right and left end positions of the current lateral width based on whichever is smaller, a deviation amount of a right end position of the object or a deviation amount of a left end position of the object.

* * * * *